US007644937B2

(12) United States Patent
Giampavolo et al.

(10) Patent No.: US 7,644,937 B2
(45) Date of Patent: Jan. 12, 2010

(54) CHILD SUPPORT FOR ATTACHMENT TO SHOPPING CART

(75) Inventors: Paul Giampavolo, 6 Kingsbridge Rd., Fairfield, NJ (US) 07860; Robert Shelton, Princeton, MA (US)

(73) Assignee: Paul Giampavolo, Budd Lake, NJ (US)

( * ) Notice: Subject to any disclaimer, the term of this patent is extended or adjusted under 35 U.S.C. 154(b) by 0 days.

(21) Appl. No.: 11/772,614

(22) Filed: Jul. 2, 2007

(65) Prior Publication Data

US 2008/0012254 A1    Jan. 17, 2008

Related U.S. Application Data

(63) Continuation of application No. 11/059,614, filed on Feb. 15, 2005, now abandoned.

(60) Provisional application No. 60/546,037, filed on Feb. 18, 2004.

(51) Int. Cl.
 *B62D 39/00* (2006.01)
(52) U.S. Cl. .............................. 280/33.991; 280/33.993
(58) Field of Classification Search ............ 280/33.991, 280/33.992, 33.993, 47.26, 47.38, 650, DIG. 4
See application file for complete search history.

(56) References Cited

U.S. PATENT DOCUMENTS

| 5,312,122 | A | * | 5/1994 | Doty ...................... 280/33.992 |
|---|---|---|---|---|
| 5,330,210 | A | | 7/1994 | Lambrecht |
| D357,105 | S | | 4/1995 | Reiland et al. |
| 5,823,548 | A | | 10/1998 | Reiland et al. |
| 5,848,797 | A | * | 12/1998 | Paez ...................... 280/33.993 |
| 5,882,021 | A | | 3/1999 | Reiland et al. |
| 6,022,031 | A | | 2/2000 | Reiland et al. |
| 6,237,924 | B1 | | 5/2001 | Reiland et al. |
| 6,270,093 | B1 | | 8/2001 | Johnson et al. |
| 6,364,326 | B1 | | 4/2002 | Reiland et al. |
| D461,612 | S | | 8/2002 | Lobban et al. |
| 6,464,238 | B2 | | 10/2002 | Reiland et al. |
| 6,513,817 | B2 | | 2/2003 | McCue et al. |
| 6,540,239 | B2 | * | 4/2003 | Lee, Jr. .................. 280/33.993 |
| 6,572,122 | B2 | | 6/2003 | Johnson et al. |
| 6,575,480 | B2 | * | 6/2003 | McKelvey ............. 280/33.993 |
| 6,702,313 | B2 | * | 3/2004 | Forshee et al. ......... 280/33.992 |
| 6,746,030 | B1 | * | 6/2004 | Bartlett .................... 280/47.38 |
| 7,073,800 | B2 | | 7/2006 | Shaw et al. |
| 7,093,841 | B2 | * | 8/2006 | Conrad .................. 280/33.993 |
| 2003/0184032 | A1 | | 10/2003 | Otterlee et al. |
| 2004/0164507 | A1 | | 8/2004 | Otterlee et al. |
| 2004/0164508 | A1 | | 8/2004 | Otterlee et al. |

* cited by examiner

*Primary Examiner*—Hau V Phan
(74) *Attorney, Agent, or Firm*—Ostrolenk Faber LLP

(57) ABSTRACT

A child carrier attachable to a shopping cart having a basket mounted to a frame supported by a plurality of caster wheels for contacting a ground surface. The child carrier comprises a support member having at least one stabilizing wheel connected thereto for contacting the ground surface. The support member has a bottom member, with a seat disposed on the support member; and an attachment fixture is connected to the support member for connecting the support member to the cart.

9 Claims, 20 Drawing Sheets

CHILD SUPPORT FOR ATTACHMENT TO SHOPPING CART

CROSS-REFERENCE TO RELATED APPLICATIONS

The present application is a continuation of U.S. application Ser. No. 11/059,614 entitled Child Support for Attachment for Shopping Cart, filed on Feb. 15, 2005, which application claims the benefit and priority of prior filed provisional application Ser. No. 60/546,037 entitled Child Support for Attachment to Shopping Cart, filed on Feb. 18, 2004, the entire disclosures of which are hereby incorporated by reference.

BACKGROUND OF THE INVENTION

1. Field of the Invention

The present invention relates to child support and securement devices, and in particular, to a device for attachment to a conventional shopping carts for securing, supporting and protecting children.

2. Description of Related Art

Carts, such as conventional shopping carts for storing, conveying or transporting groceries or other products are known in the art to comprise a basket rigidly connected to a frame supported by two front swivel caster wheels and two rear caster wheels and the frame forms a handle at an upper, rear extremity of the cart. Conventional shopping carts usually have a collapsible child seat near the handle of the cart, suitable for only a single child and often inadequately designed for a child weighing more than 35 pounds. Placement of children in these conventional seats alters the center of gravity of the cart, thereby making the carts, especially with an empty basket, susceptible to tipping. Injuries resulting form use of these existing child seats are well documented and known in the art. (See U.S. Pat. No. 6,364,326 B1 to Reiland et al., cols. 1 and 2; see also, Consumer Product Safety Alert from the U.S. Consumer Product Safety Commissioner, March 1990, which are both hereby incorporated by reference). As a result of the documented shortcomings of the conventional cart there have been various attempts at creating child support attachments and/or redesigning the conventional carts without the level of success that will be evident in the present invention.

In various U.S. patents to Reiland, et al. (U.S. Pat. No. 6,364,326, which is a continuation of U.S. Pat. No. 6,022,031, which is a continuation of U.S. Pat. No. 5,882,021, which is a continuation of U.S. Pat. No. 5,823,548, which is now abandoned; and Des. Pat. No. D357,105) several attempts were made to find an "economically viable solution to child injuries needs while utilizing the existing inventory of carts, without significantly reducing the overall functionality of the carts." The "child carrier" of these designs includes a platform supported by at least one caster, at least one seat area, and a restraining device for each seat, such as a seat belt, to hold the child in place. The carrier is rigidly attached to the rear portion of the cart. However, these designs have their flaws to which the present invention turns its attention. While in the Reiland child seat, children are in proximate range of the upper rear extremity of the cart basket and are not necessarily facing away from the basket, therefore, they have visual and potentially physical access to items placed in the rear and upper portions of the cart. Furthermore, these carriers are not stackable or nestable along a horizontal axis, making them difficult for shopkeepers to store or retrieve from the store and/or parking lot after use. These designs fail to address the advantages associated with a nestable attachment, specifically, a shopkeeper can move several carriers in unison by interlocking them together along their horizontal axis. Also, these carriers are rigidly attached to the cart with a nut and bolt arrangement making the cart and child carrier accessory an integral unit and therefore are not easily removable from one another. This requires a shopkeeper to designate a certain number of an inventory of conventional carts to use as integrated child carriers. These carts are then not nestable and are undesirable to shoppers not accompanied by small children.

U.S. Pat. No. 6,464,238 to Reiland et al. depicts a passenger carrier attached to a cart in the form of a nesting, attachable apparatus having a seat that includes an upper portion in a first position that can be displaced to a second position to form an opening sized to receive a front portion of another cart basket in a nested configuration. This device also seats a child in proximate range of the upper rear extremity of the cart basket and thus is not necessarily facing away from the basket. Therefore, the child has visual and potentially physical access to items placed in the rear and upper portions of the cart. A more significant shortcoming of this design is that substantial space between the cart and the attachment apparatus is required to accommodate the displacement of the upper portion from the first to the second position when nesting. This additional length associated with this attachment significantly reduces the functionality of a cart because it places the cart basket out of a user's arms reach when pushing the cart from the rear handle. Thus, in order to select items and place them in the cart basket, one must walk away from the cart and the child in the attached seat, obtain an item, walk to the basket, deposit the item and then return to the rear again in order to push the cart. Furthermore, the apparatus is bolted to the cart creating an apparatus that is not easily detachable carrying the same disadvantages as discussed above. Also, the attachment lacks entertainment value to children.

Other attempts at modifying the child seat accommodations of conventional shopping carts have resulted in complete redesigns and abandonment of the conventional shopping cart. One such prior apparatus is depicted in U.S. Pat. No. 6,237,924 to Reiland et al. which shows a compete redesign of the size, dimensions and configuration of the cart's basket to incorporate child seating within the center basket area as opposed to the conventionally oriented rear seating. While this cart is nestable, it fails to meet the child seating needs for shopping centers having an inventory of conventionally designed carts because these devices require replacement of existing, conventional carts to obtain the benefits of their child seating capabilities.

For at least the same reason, U.S. Pat. No. 5,330,210 to Lamnberecht fails to meet the child seating needs for shopping centers because it shows an attachable shell designed to accommodate only a particular cart design and not the standard, conventional shopping cart. The cart has a shallow basket supported by an upper frame and a large gap between the upper frame and a lower frame sized to accommodate a child's torso and head. The shell is slid over the lower frame and rests completely thereon underneath the basket. The shell includes a seat for locating a child directly below the upper basket of the cart and may be shaped as a race car or other such entertaining shape. This design is not adaptable to the conventional cart design because there is not enough room to safely place a child underneath the basket on a conventional cart. Therefore, in order to adopt the Lamnberecht design, a shopkeeper must abandon the use of conventional carts for a modified cart that is atypical of carts typically used in grocery stores.

Another apparatus having entertainment value for children also resulted in a redesigned cart. In U.S. Pat. No. 6,513,817 to McCue et al the disclosed apparatus is a redesigned shopping cart having a child supporting apparatus and storage compartment. The device described incorporates a shopping basket in a supporting structure, for example, shaped like an automobile, and thereby is a complete redesign of a shopping cart and is not adaptable to conventional shopping carts.

SUMMARY OF THE INVENTION

There exists in the art a need for a child support attachment that easily attaches to and detaches from a conventional shopping cart for securing, supporting and protecting one or more children without having to redesign the shopping cart and without significantly reducing the functionality of conventional shopping carts. Furthermore, the support attachment should achieve effective separation between the child and a basket of the attached shopping cart. Even further, the support attachment should be nestable along its horizontal axis. The present invention is directed toward further solutions in this art.

An object of the present invention is to provide a support attachment for supporting at least one child and attachment to a front region of the basket and/or the frame of the conventional cart.

Another object of the present invention is to provide a support attachment for supporting at least one child that attaches to a rear portion of the conventional cart.

Yet another object of the support attachment of the present invention is to provide a support attachment that is easily connected to and detach from the basket and/or frame.

An even further object of the present invention is to provide a support attachment that is substantially supported by the basket and/or frame of the cart.

Yet another object of the present invention is to provide a support attachment capable of being a stable, freestanding cart and attachable to a conventional cart.

A further object of the present invention is to provide a support attachment having a body in a shape similar to one of an automobile, a sled, a train, a tractor, an aircraft, a truck, a wagon or a ship, in addition to other known forms of conveyance, for entertaining children passengers.

An even further object of the present invention is to provide a nestable support attachment to a conventional cart.

Another object of the present invention is to provide a support attachment having adjustable connection means for connecting to a wide variety of makes and sizes of the conventional shopping cart.

A further object of the present invention is to provide a freestanding support attachment that is capable of fully supporting the weight of the attached shopping cart.

Other features and advantages of the present invention will become apparent from the following description of the invention which refers to the accompanying drawings.

BRIEF DESCRIPTION OF THE DRAWINGS

For the purposes of illustrating the invention, there is shown in the drawings a form which is presently preferred, it being understood, however, that the invention is not limited to the precise arrangements and instrumentalities shown. The features and advantages of the present invention will become apparent from the following description of the invention that refers to the accompanying drawings, in which.

DETAILED DESCRIPTION OF PREFERRED EMBODIMENTS OF THE INVENTION

Figure 1:
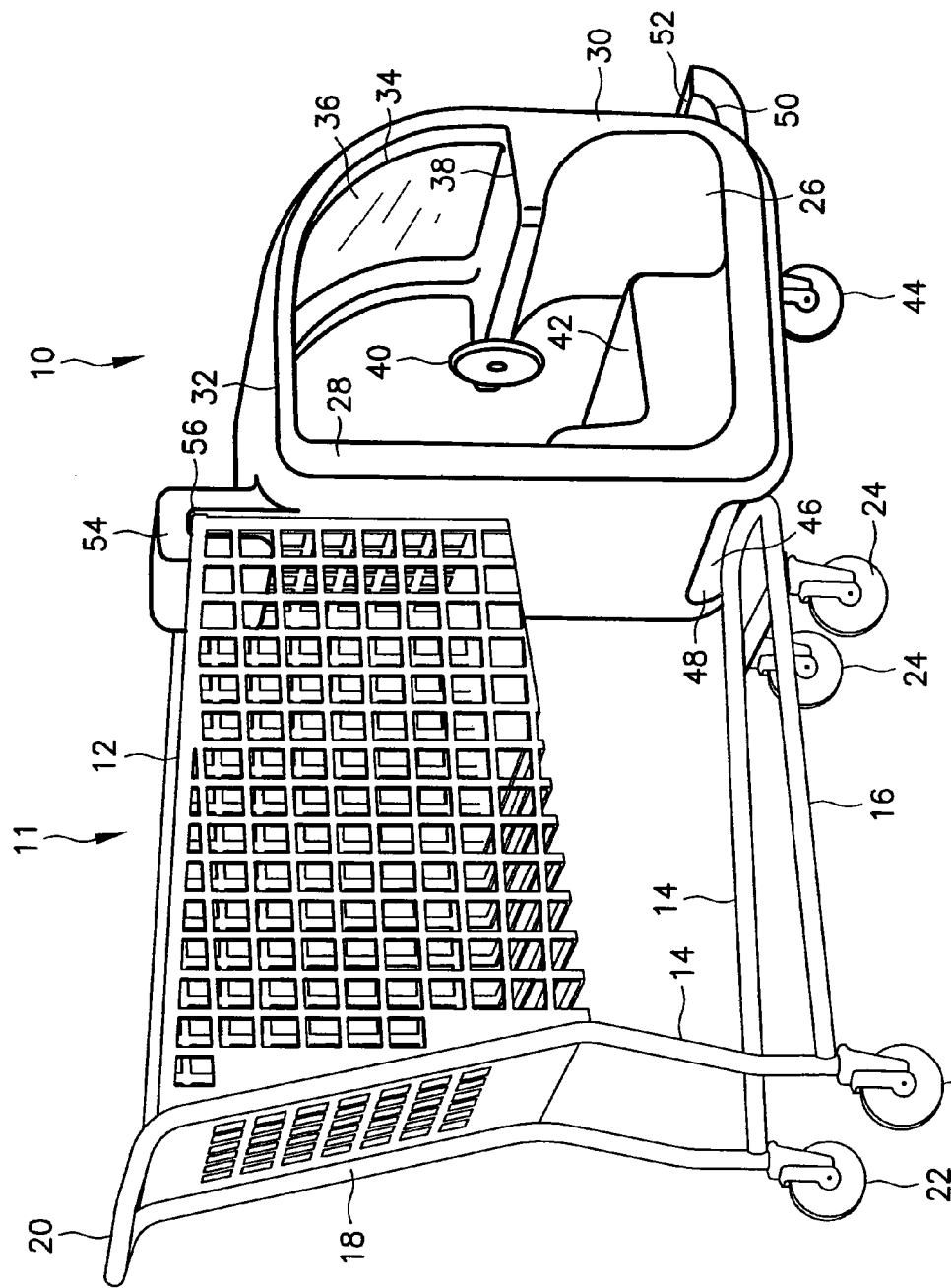
FIG. 1 illustrates a perspective view of a child support attachment in accordance with an embodiment of the present invention connected to a front portion of a cart basket.
Figure 2:
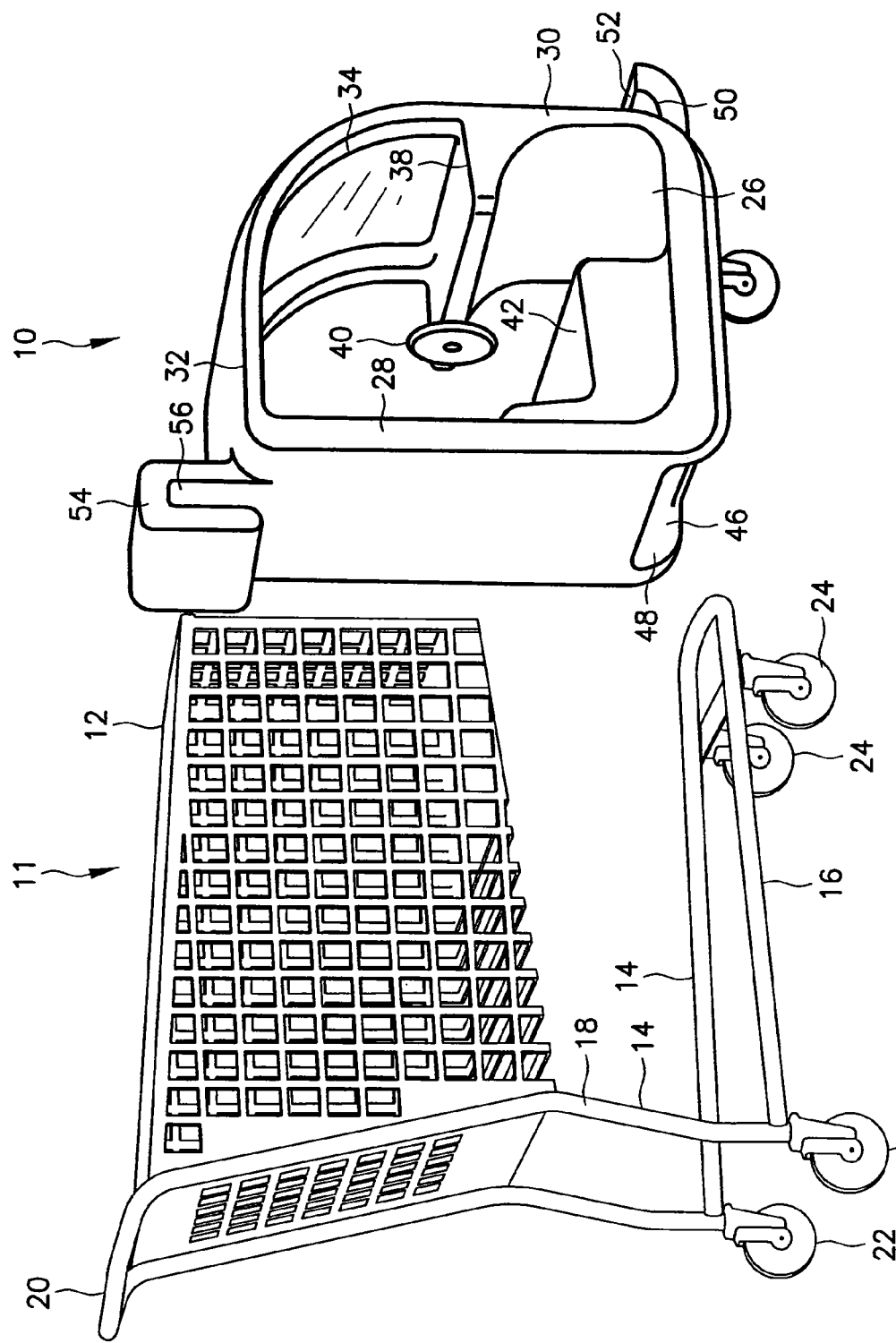
FIG. 2 shows a perspective view of the child support attachment illustrated in FIG. 1 detached from the shopping cart.

FIGS. 1 and 2 illustrate a child support device 10 attachable to a conventional shopping cart 11 that has a basket 12 and a metal tube frame 14. The cart 11 is shown to have a basic form that is common to most conventional shopping carts. The basket 12 is usually a metal or plastic basket having substantially vertical walls. The frame 14 usually includes a horizontal base frame member 16 connected to a vertical frame member 18. The vertical frame member 18 forms a handle 20 at an end furthest from the base frame member 16. Frame member 16 extends horizontally away from the vertical frame member 18. The frame 14 is supported by caster wheels 22 near the connection of frame members 16 and 18, and is supported by swivel caster wheels 24 at a distal end of frame member 16 furthest from frame member 18. This tube frame structure 14 is commonly known in the art with slight variations from this basic structure on the conventional shopping cart.

The child support attachment device 10, as embodied in FIGS. 1 and 2 is shown to be a structure having a partially enclosed interior cavity defined by a support member comprising a base member 26 having a seat 42 connected thereto. Here the support attachment 10 is formed to be a carrier structure having a rear wall 28 connected to the base member opposite a front wall 30 and a roof member 32, which is positioned opposite the base member 26 and extends between the rear and front walls 28 and 30 respectively. The seat may be integral with the base member 26 and rear wall 28. The internal cavity created by this structure is dimensioned to accommodate at least one child. The support attachment may however be as simple as a seat having a seat bottom and a seat back connected to the base member and the base member being attached to the cart 11. Here, the support structure 10 is further configured to resemble an automobile, truck, tractor, boat, train or other figure of interest for added entertainment value. The front wall 30 has an opening 34 therein which may me covered with a translucent cover 36 forming a window. Beneath the opening 34, a dash board 38 extends into the inner cavity from the front wall 30 providing a handle for a child to grab and/or providing a surface for placing a child's toys. The handle may be provided in the form of at least one steering-wheel 40 for added entertainment value. A seat 42, having a bottom and a back support, is provided in the interior cavity opposite the front wall 30 and integrated to the floor member 26. The seat 42 may be contoured for added comfort and may use the rear wall 28 as a back support. The seat 42 in this, as in all embodiments of the present invention, is configured so that a child placed thereon faces away from the cart basket 12; thus, the child is not tempted to reach for objects in the basket 12 because it is not visible to the child, also the child would have to completely turn around in his/her seat to access the cart basket 12. This orientation of the seat 42 significantly reduces the ability of a child to reach into the basket 12. Furthermore, the seat 42 may be configured to accommodate one or more children as a bench seat or partitioned into separate seating areas for each child. The structure 10 has open sides through which the child can enter and exit the support structure 10. Seat belts (not shown) are provided to strap the child into their seat. Alternatively, the sides can be partly closed by rigid, non-movable side walls and the child can enter either via an open top where the structure has no roof member, an opening is provided in the roof member or in an opening provided between the rigid side walls the roof member. Alternatively, pivotally attached doors or gates can be provided to secure the child.

The child supporting structure 10 rests upon one or more stabilizing wheels 44 connected to an under side of the floor member 26 for supporting and stabilizing the structure and at least one child. The at least one stabilizing wheel 44 can include a caster or swivel caster wheel. The stabilizing wheel can aid in carrying the weight of the at least one child and support structure or can be con figured to carry all of the weight. The external, bottom side of the rear wall 28 has a groove 46 having an upper ledge 48. Extending from the external side of the front wall 30 is a bumper 50 having a notch 52. The groove 46 is configured to receive the front end of the horizontal frame member 16 when the support attachment 10 is connected to a cart 11. Whereby the support structure 10 may rest on the frame member 16 via ledge 48 for added stability. Also, when the support structure 10 is not attached to a cart 11, it may be nested with other similar support structures 10 because the groove 46 is also configured to receive the bumper 50, with ledge 48 engaging notch 52, see FIG. 19. For connecting to a conventional cart 11, the child support device 10 includes a channel member 54 extending from the rear wall 28. The channel member 54 has a channel 56 that is arranged and dimensioned to receive a top edge of the front of the shopping cart basket 12. For example, the channel 56 has a radius of curvature which is slightly greater than the outer radius of the top edge of the cart basket 12.

Figure 3:
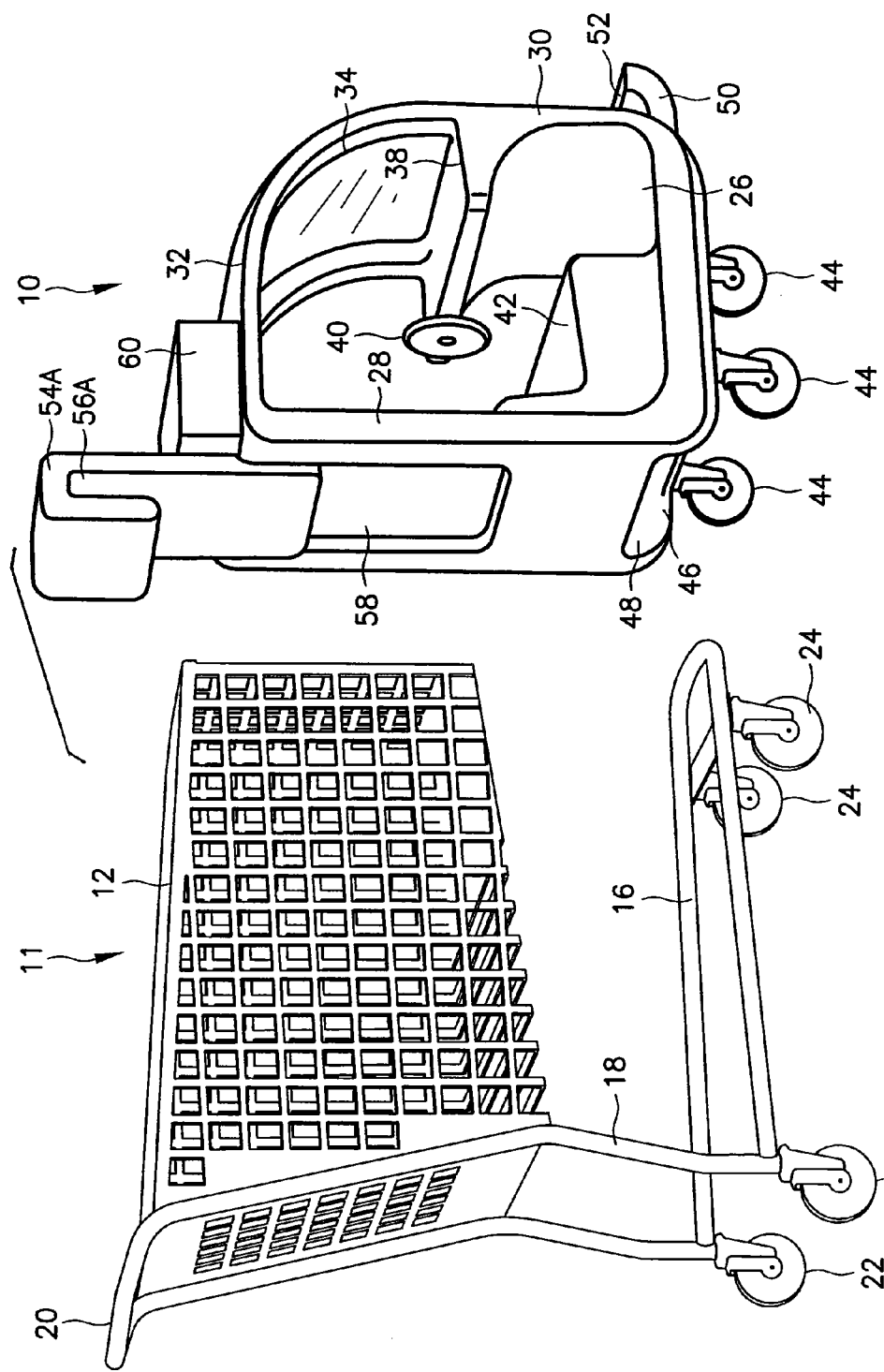
FIG. 3 illustrates a perspective view of a free standing child support attachment having an adjustable device for connecting to a front portion of a shopping cart basket in accordance with another embodiment of the present invention.
Figure 4:
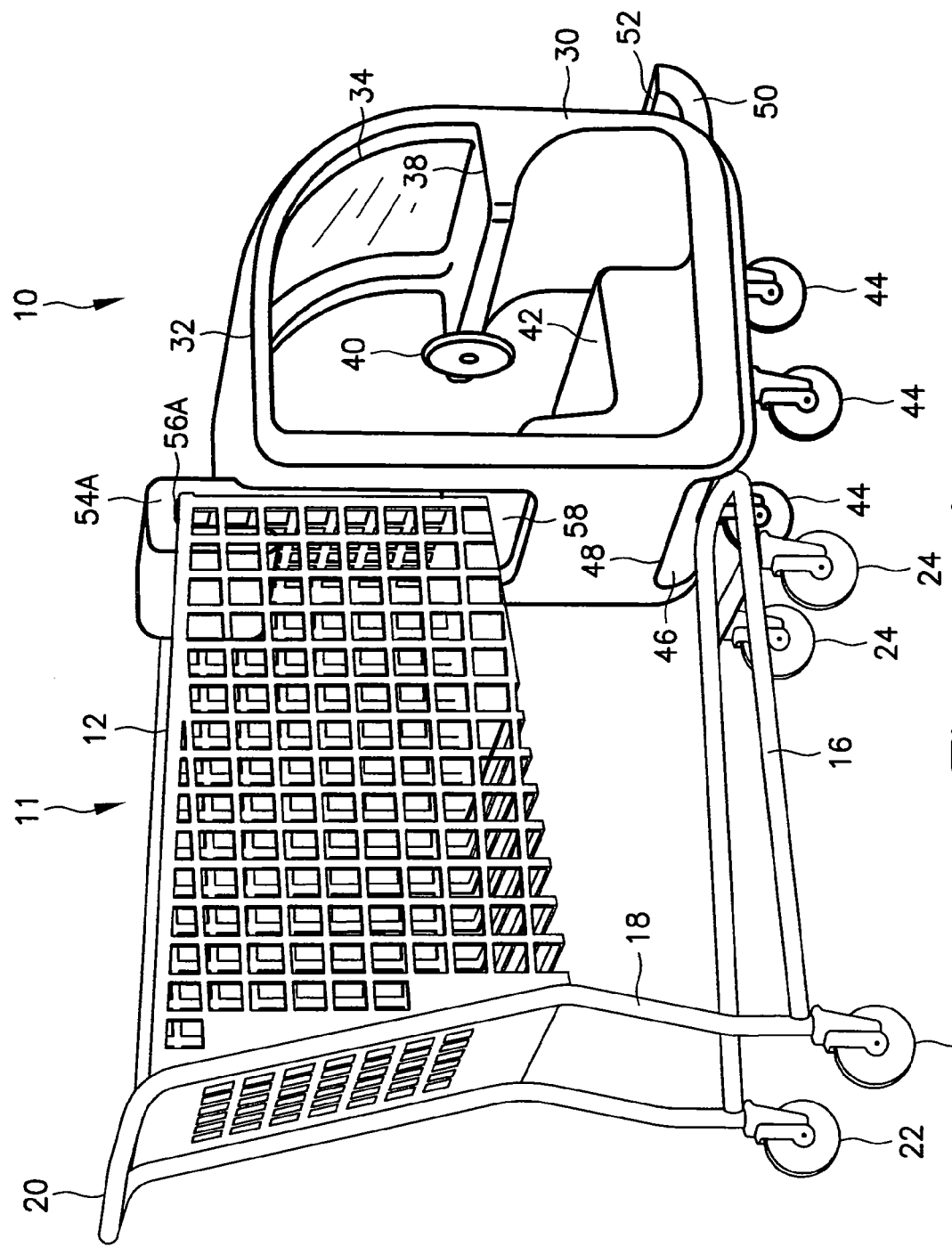
FIG. 4 shows a perspective view of the child support attachment of FIG. 3 attached to the cart basket.

FIGS. 3 and 4 show a free standing embodiment of the child support attachment 10 having, in the shown embodiment, three stabilizing wheels 44. A lesser or greater number of which can be used, for example one wheel. Like the previous embodiment, the stabilizing wheels 44 can include any combination of caster wheels and/or swivel caster wheels. Furthermore, the channel member 54A of the present embodiment is slidable in a vertical slot 58 along the external surface of the rear wall 28 of the support structure 10. In this way, the height of the channel 56A within the channel member 54A can be adjusted to engage and disengage from the front, top edge of the shopping cart basket 12. Further regarding FIG. 3, a personal basket 60 is added on top of the roof member 32 for placement of selected items. Thus, when the support structure 10 is not attached to a cart 11 it can be used separately as a child carrier and double as a personal cart, whereby the channel member 54A acts as a handle for pushing the structure 10 along a floor. When the structure is connected to a cart via the channel member 54A, as shown in FIG. 4, the cart 11 is used to horizontally push the structure 10 along the floor.

Figure 11:
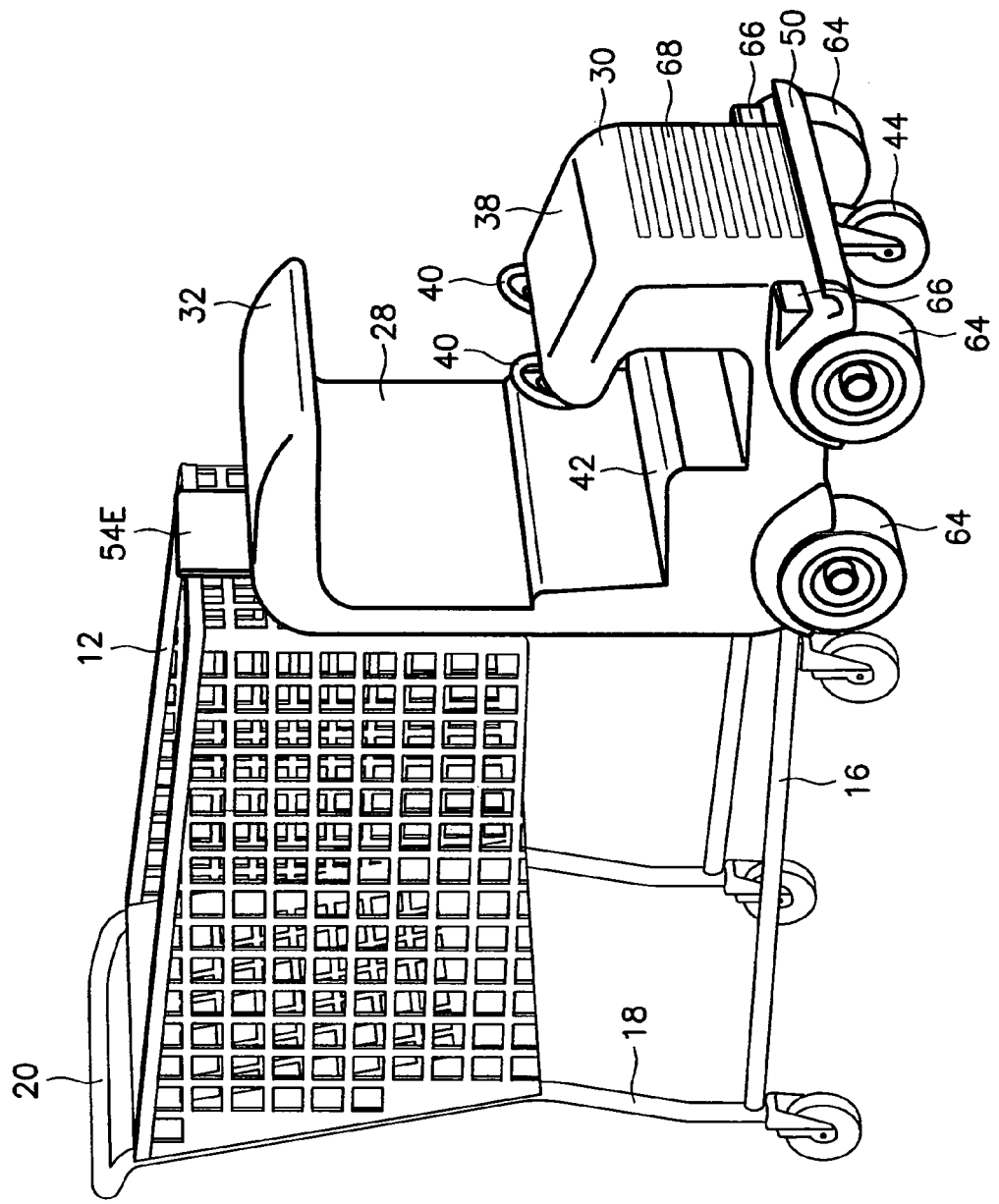
FIG. 11 illustrates a perspective view of a child support attachment resembling a tractor rigidly attached to the front of a cart basket in accordance with another embodiment of the present invention.

FIGS. 5 through 13 illustrate a child support attachment device 10 configured to resemble a tractor. Fake wheels 64 are placed at its corners for aesthetic purposes but do not touch the floor under normal conditions. The stabilizing wheels 44 provided inward from the fake wheels 64 actually support the structure 10 by contacting the ground surface. If jostled, the fake wheels 64 can act as lateral stabilizing devices by touching the floor and preventing the support structure from tipping over until the destabilizing event can be corrected. In keeping with the tractor like appearance, the roof member 32 is only attached to the rear wall 28, thereby providing an opening between the roof 32 and front wall 30 members. The front wall 30 extends from the floor member 26 and integrally forms a dashboard 38. Pivotally mounted to the dashboard are two steering wheels 40 for a child to hold and spin. The roof member 32, although only connected to the rear wall 28, is strong enough to support a personal basket 60 and selected items placed therein. The tractor can optionally be fitted with side doors and a translucent windshield for further protecting a child passenger. Further adding to the aesthetic appeal, the structure 10 includes headlight FIG. 66 and a grill configuration 68 on the exterior of the front wall 26, as can be seen in FIG. 11. Decals, painting or other forms of demarcation may be used to created these and other images resembling a tractor or other desired figure, i.e. a truck, automobile, boat, train etc.

Figure 5:
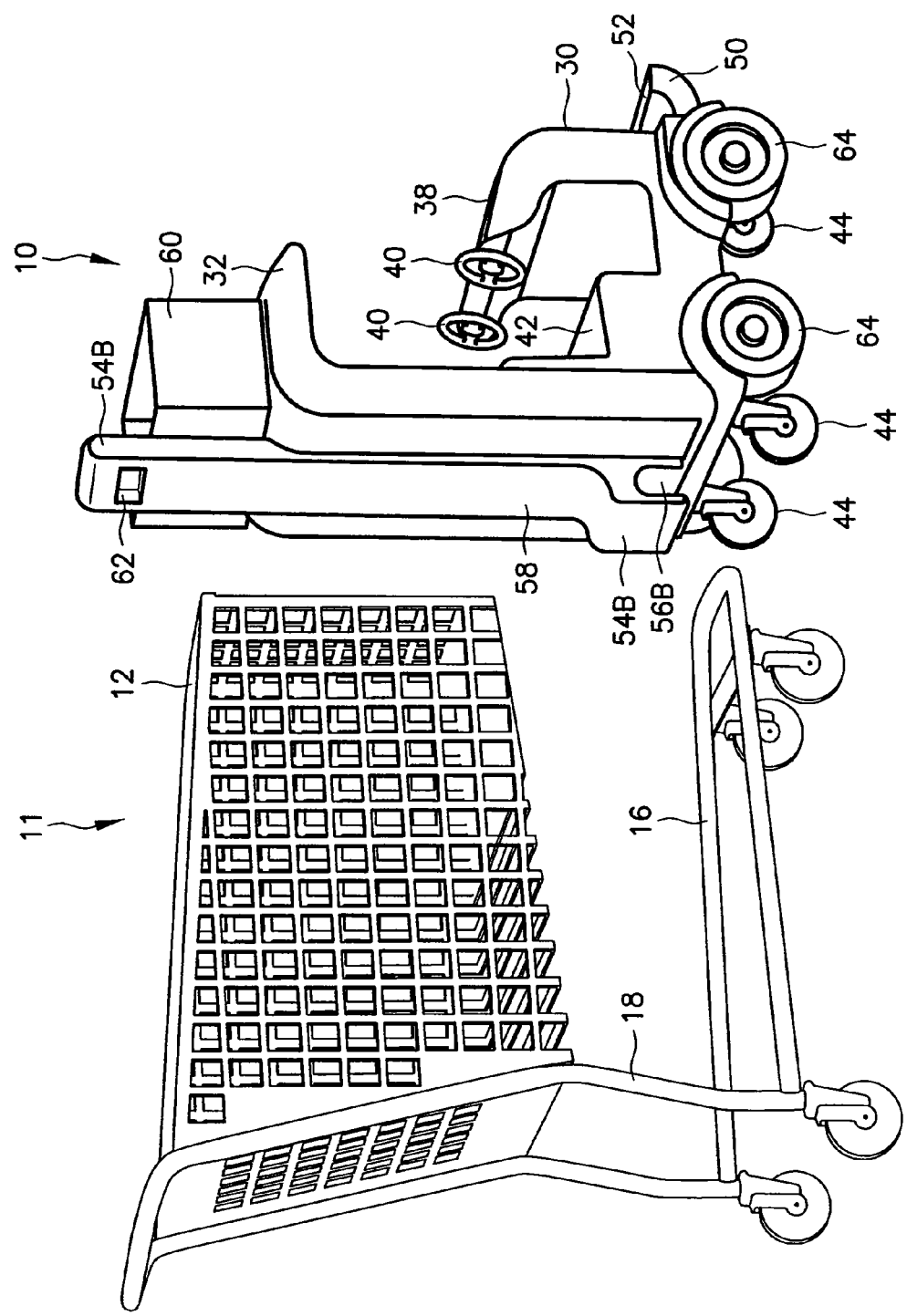
FIG. 5 illustrates a perspective view of a free standing child support attachment having an adjustable device for connecting to a shopping cart frame, a self contained basket and a nesting apparatus in accordance with another embodiment of the present invention.
Figure 6:
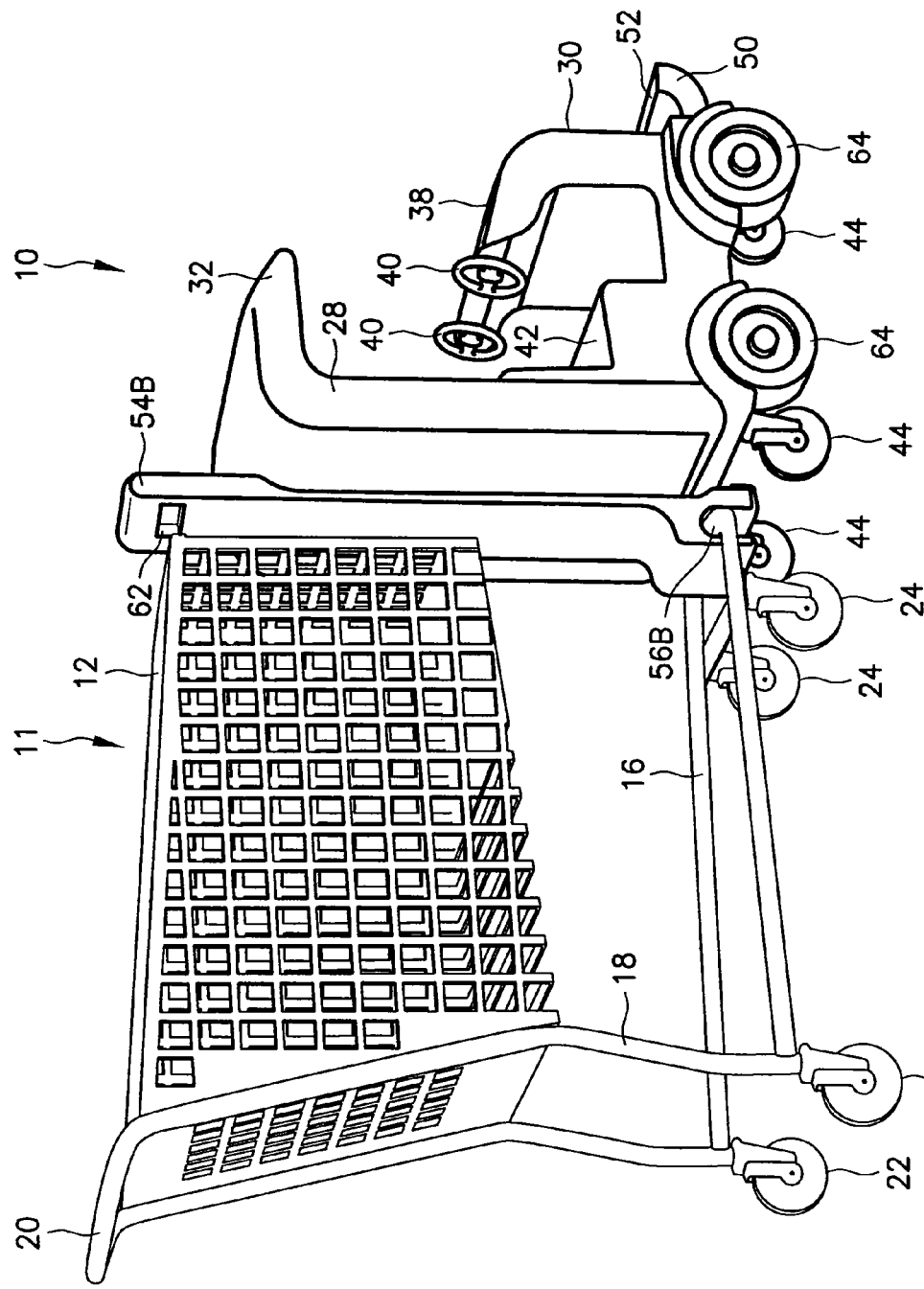
FIG. 6 shows a perspective view of the free standing child support attachment as shown in FIG. 5 attached to a front portion of the cart frame.
Figure 7:
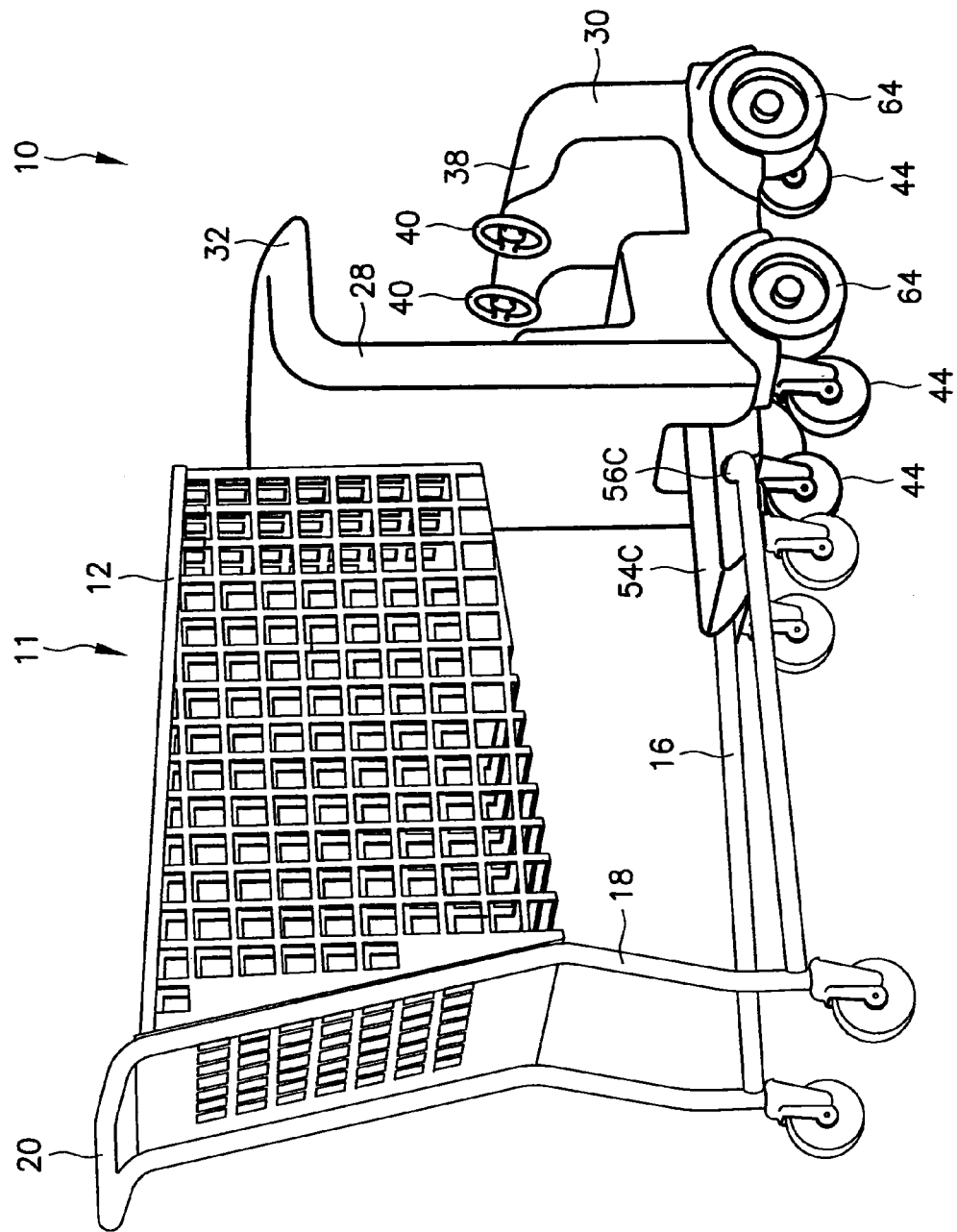
FIG. 7 illustrates a perspective view of a child support attachment attached to a front portion of a conventional cart frame by a horizontal grooved member pivoting about a traverse axis and extending from the rear of the child support attachment in accordance with another embodiment of the present invention.
Figure 8:
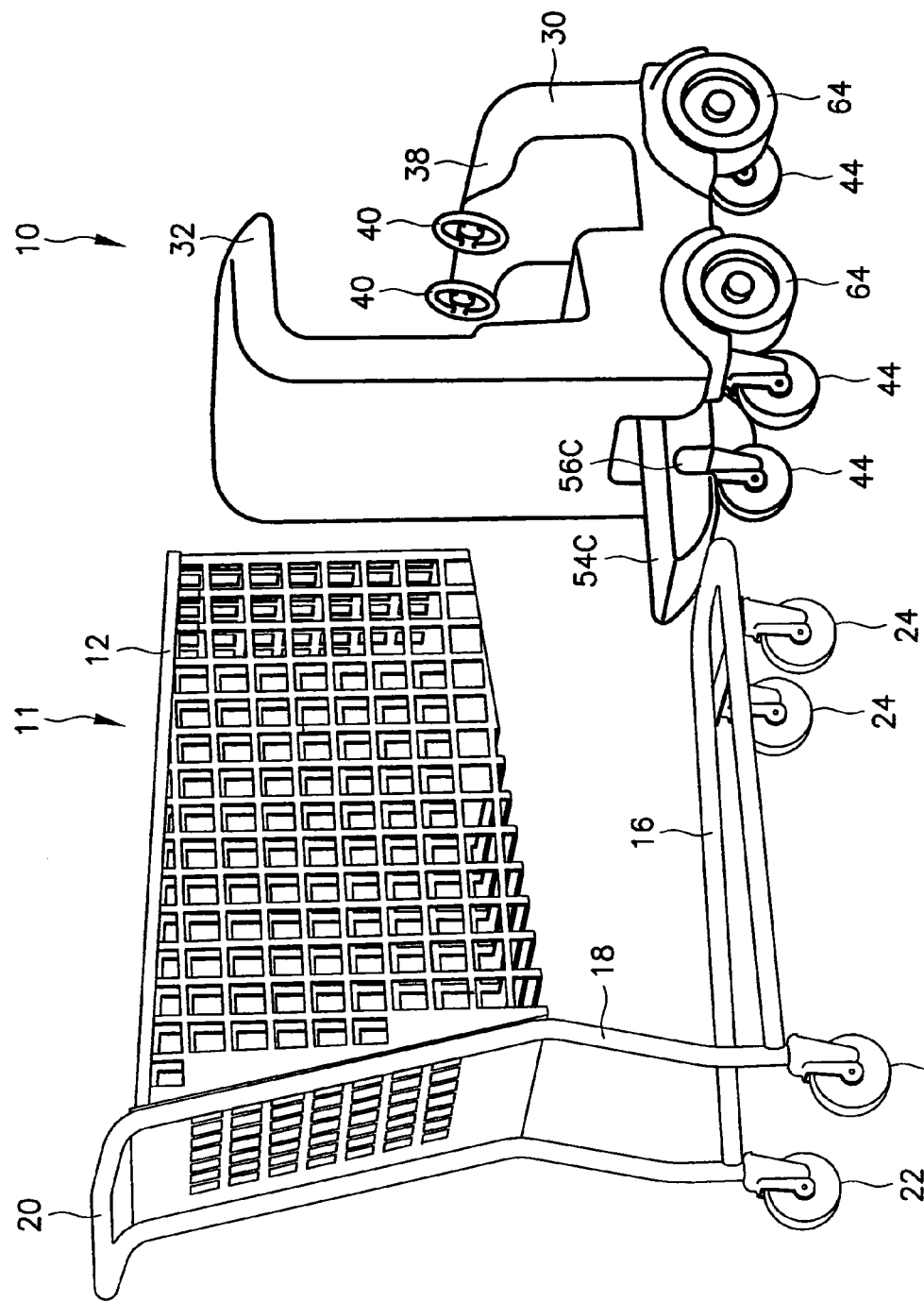
FIG. 8 shows a perspective view of the child support attachment device as shown in FIG. 7 detached from the cart.
Figure 9:
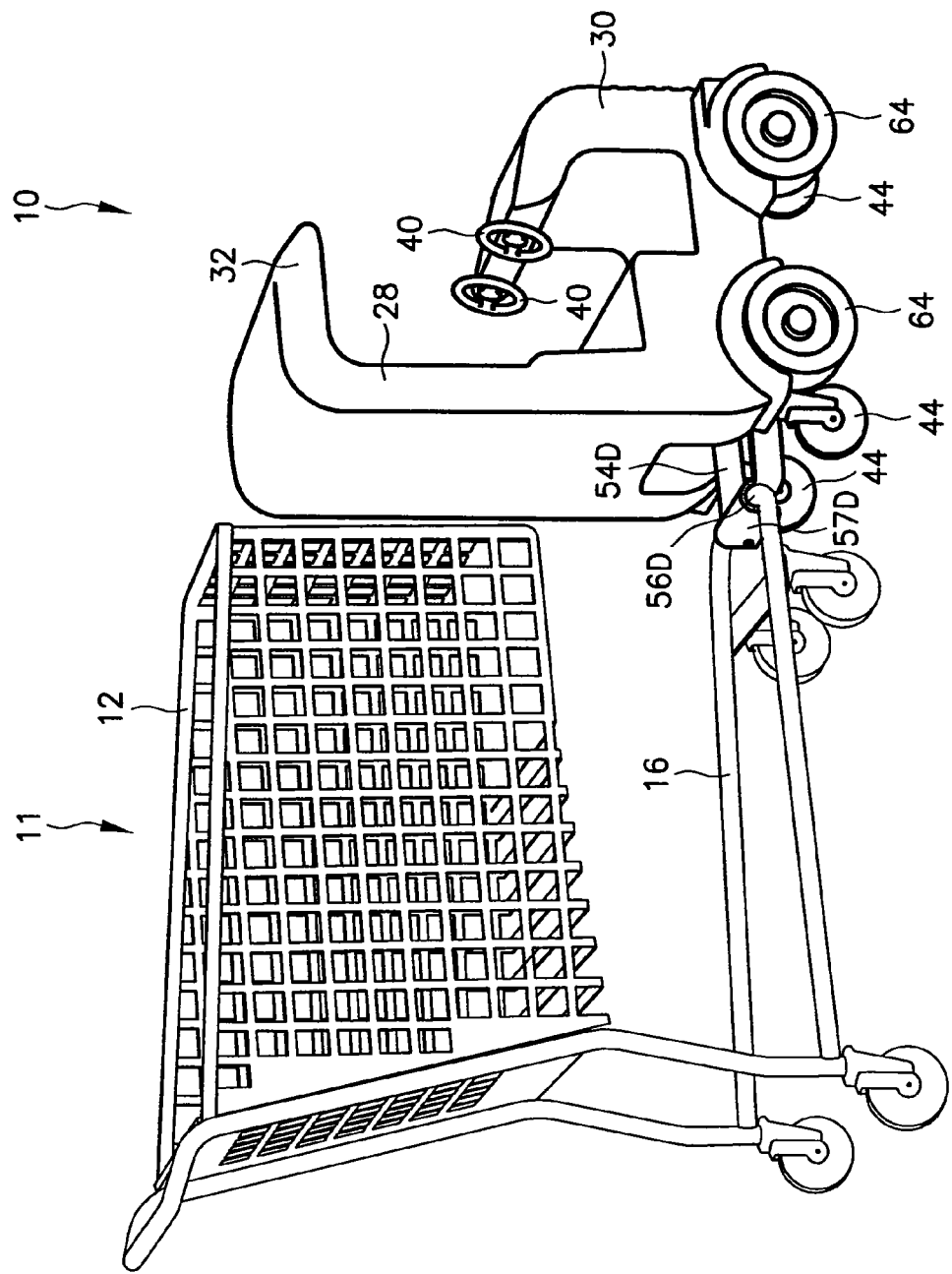
FIG. 9 illustrates a perspective view of a child support attachment rigidly connected to a front region of the cart frame in accordance with another embodiment of the present invention.
Figure 10:
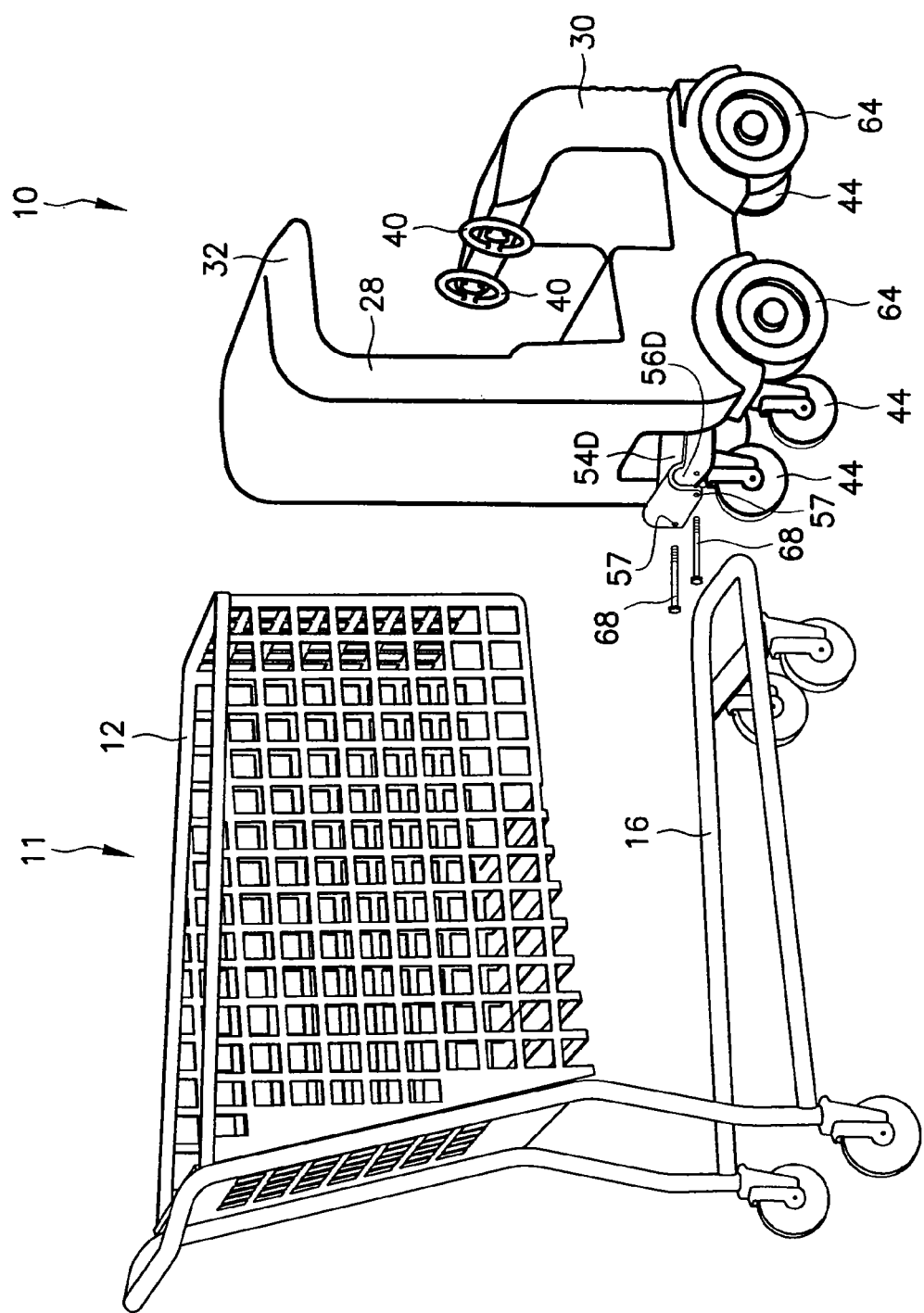
FIG. 10 illustrates a perspective view of the child support attachment as shown in FIG. 9 detached from the cart frame.

FIGS. 5 and 6 illustrate a freestanding embodiment of the child support attachment 10 having, in the embodiment shown, three stabilizing wheels 44. A lesser or greater number of wheels can be used, for example one wheel. In this embodiment, the channel member 54B is slidable in a vertical channel 58 along the rear wall 28 of the support structure 10. The member 54B has a top and a bottom distal end. A channel 56B is provided along its bottom end that is adapted to engage with the front portion of the horizontal frame member 16 of the shopping cart 11 when connected thereto, as seen in FIG. 6. For example, the channel 56B has a radius of curvature which is slightly greater than the outer radius frame member 16. The channel 56B is also configured to receive the front edge 52 of the bumper 50 for nesting with similarly configured child support attachments, see FIG. 20. An opening 62 is provided near the top end of member 54B for a user to easily grasp the channel member 54B to adjust its relative vertical position or to push the support structure 10 along the floor.

FIGS. 7 through 10 show another embodiment of the invention whereby a horizontal member engages the front region of the frame member 16. Regarding FIGS. 7 and 8, a horizontal channel member 54C is provided which extends approximately horizontally from the rear of the support structure 10 that is pivotable about a transverse horizontal pivot axis. The member 54C includes a channel 56C which receives a front region of the frame member 16 of the shopping cart 11 to secure the support structure 10 to the front of the shopping cart 11. Member 54C and the associated channel 56C are configured to easily engage and disengage the frame member 16. Regarding FIGS. 9 and 10, a more rigid connection to the cart 11 is provided with a channel member 54D having a channel 56D with recesses 57D provided therein for receiving at least one bolt 68 to rigidly secure the frame 16 to channel 54D. Like the embodiments shown in FIGS. 7 and 8, a horizontal channel member 54D is provided which extends approximately horizontally from the rear of the support structure 10 and which is pivotable about a traverse horizontal pivot axis. The member 54D includes a channel 56D configured to receive the front region of frame member 16. To disengage member 54D from the frame 16, the at least one bolt 68 must be removed.

Figure 12:
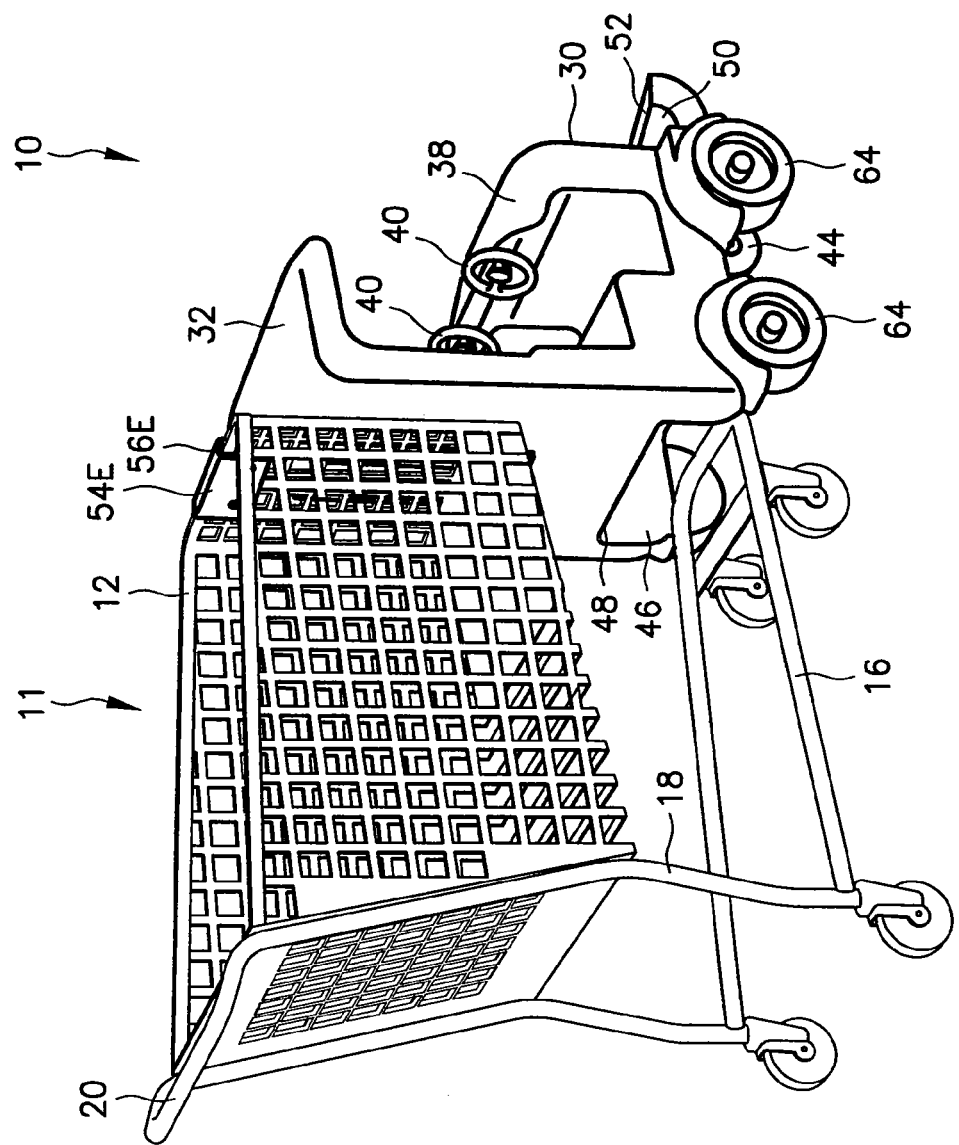
FIG. 12 shows a child support attachment rigidly connected to the front of the cart basket.
Figure 13:
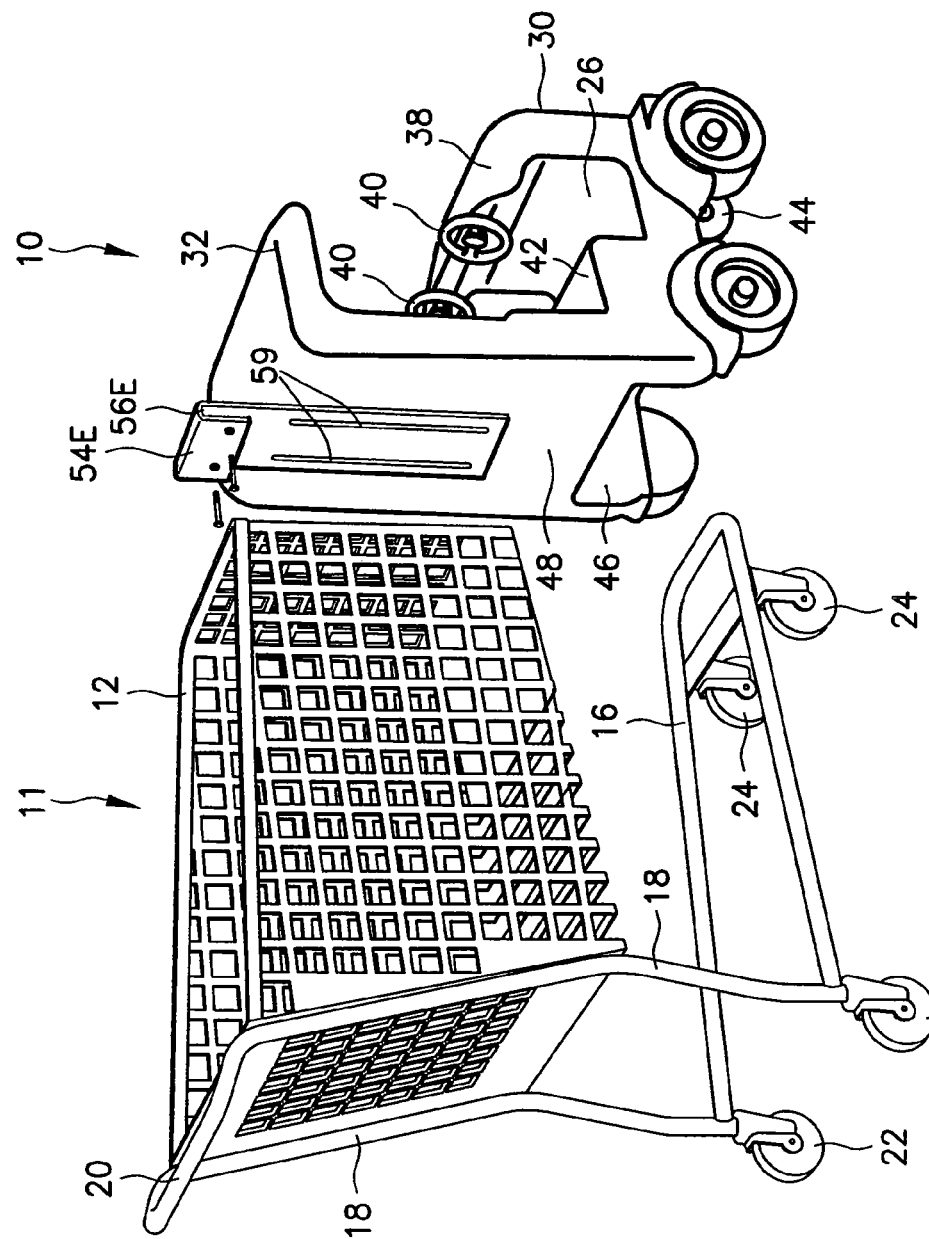
FIG. 13 illustrates a perspective view of the child support attachment as shown in FIG. 12 detached from the cart basket.
Figure 14:
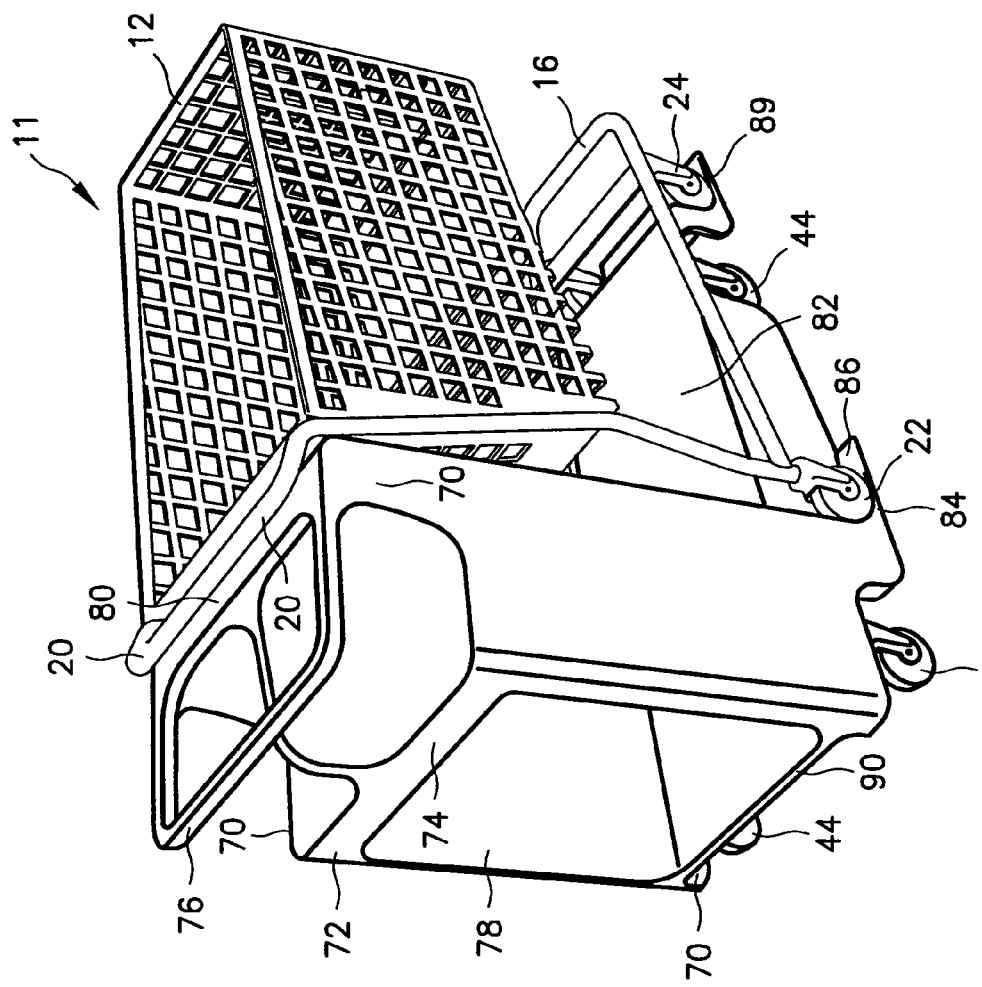
FIG. 14 shows a free standing child support attachment attachable from the rear of the cart and capable of fully supporting the cart in accordance with another embodiment of the present invention.
Figure 15:
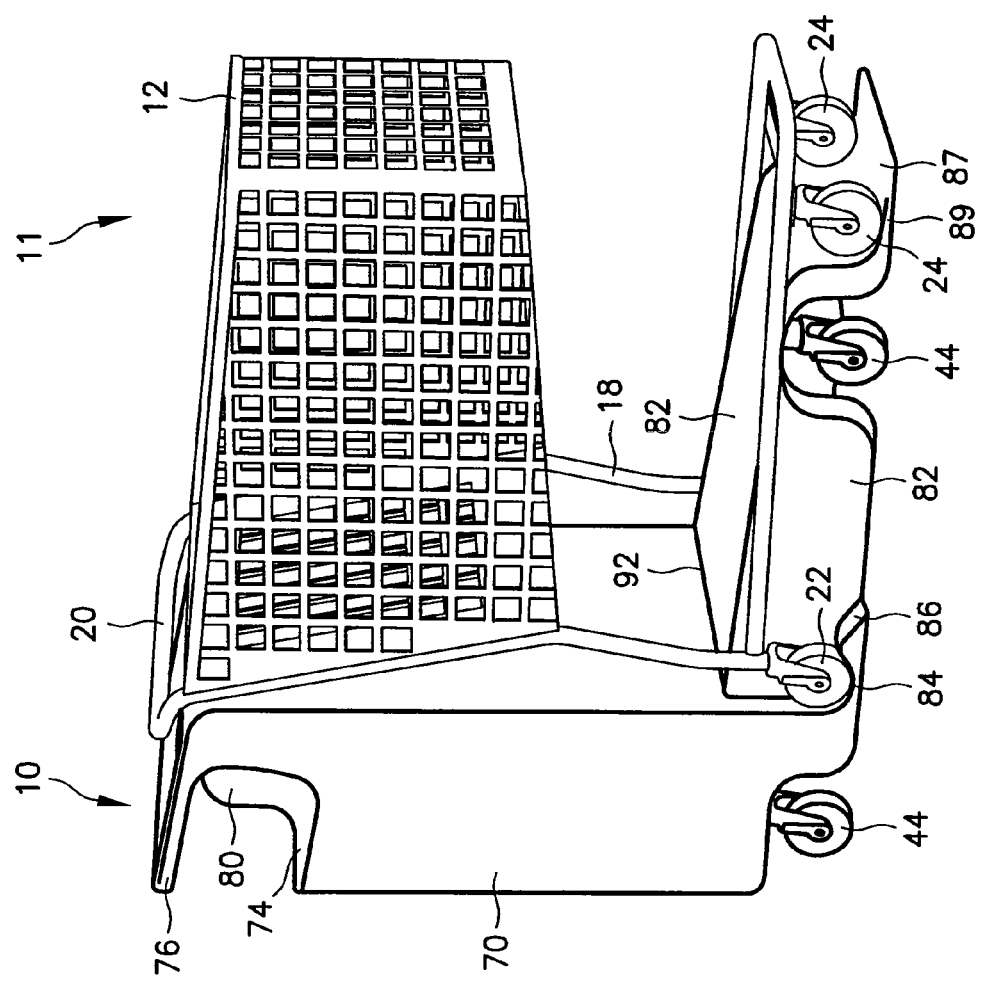
FIG. 15 illustrates a front perspective view of the support attachment shown in FIG. 14 having a cart resting thereon.
Figure 16:
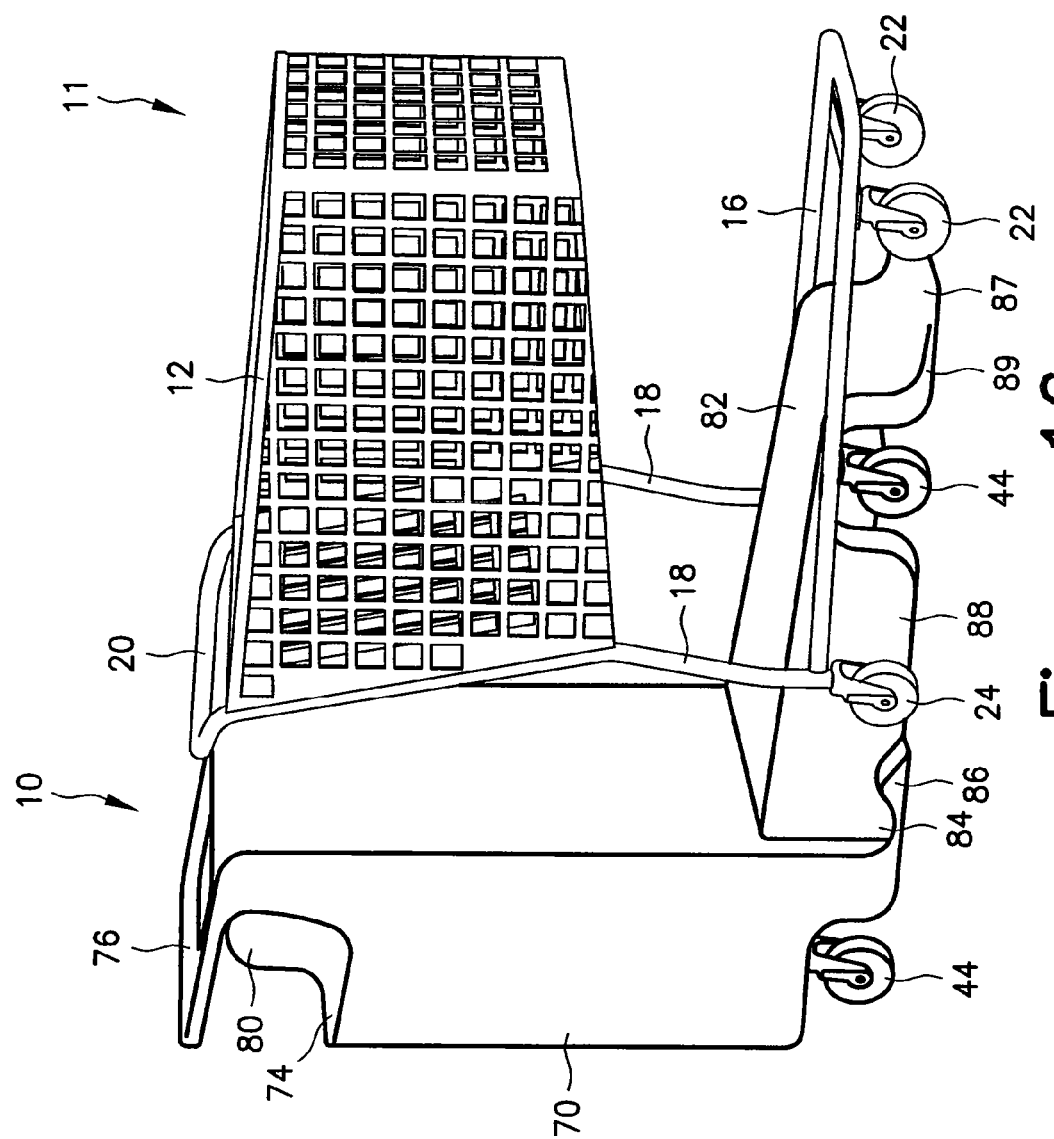
FIG. 16 shows a perspective view of a free standing child support attachment attachable from the rear of the cart for pushing a cart remaining standing on the floor in accordance with another embodiment of the present invention.
Figure 17:
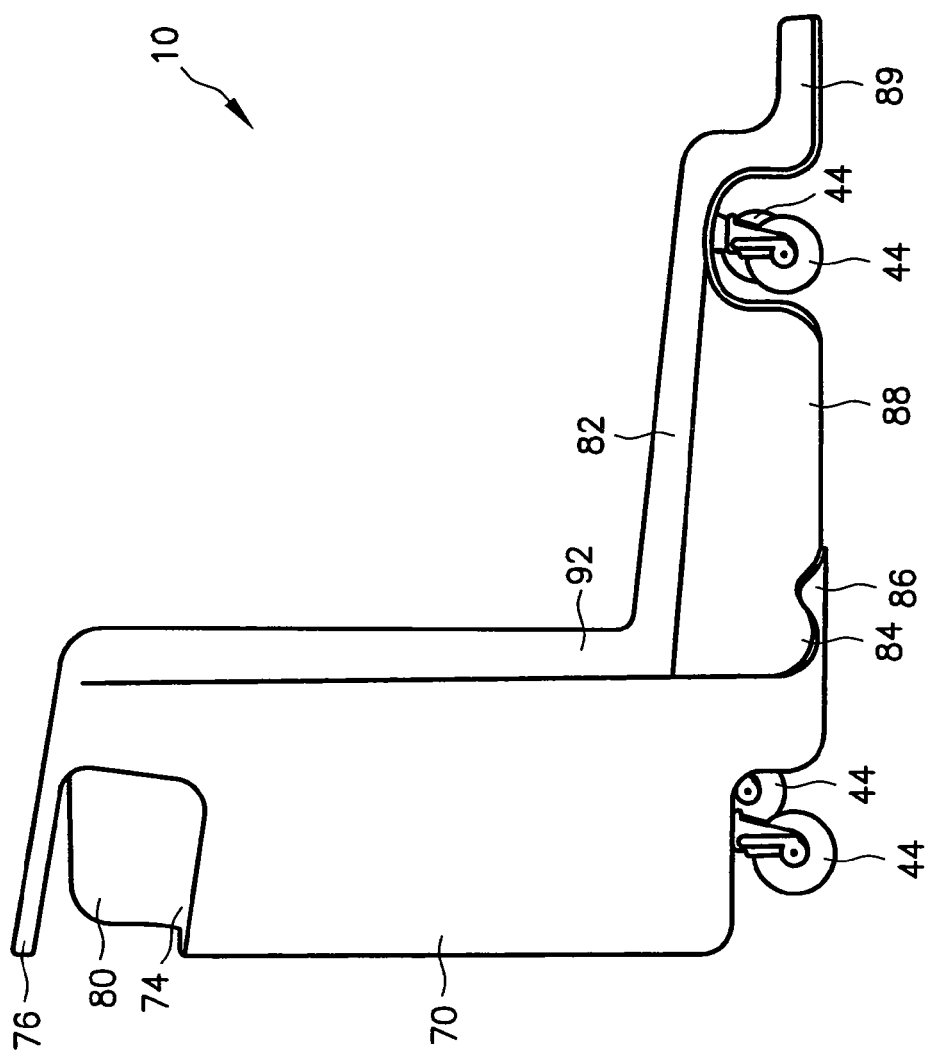
FIG. 17 illustrates a perspective view of the child support attachment embodiment shown in FIG. 15.

FIGS. 11 through 13 show another embodiment wherein the support structure 10 is provided with a channel member 54E that is configured to rigidly connect the support structure 10 to the basket 12 of the conventional cart 11. The channel member 54E is high mounted and is adapted to engage with an upper front edge of the shopping cart basket 12. The member 54E has a channel 56E with an inner radius sized to be slightly larger than the outer radius of the front edge of the shopping cart basket 12. The channeled member 54E is secured to the shopping cart basket 12 by at least one bolt 68, as shown in FIG. 13, extending through openings 57D in the channeled member 54E and through the front wall of the basket 12. The member 54E is vertically adjustable on the support structure 10 by virtue of elongated slots 59, through which fastening members connect to the support structure 10.

FIGS. 14 through 17 show another embodiment wherein the support structure 10 is mounted at the rear of the shopping cart 11. The support structure 10 includes a vertical housing 70 having a top and bottom and front and rear sides, whereby the front side is configured to have a width equal to a width of the vertical frame member 18 of the conventional cart 11, and is configured to have a height slightly lower than the handle 20 of a conventional cart 11. Provided at the top of the housing 70 are seating areas 72 and 74 for supporting at least one child, preferably two children, such that a child in the seating area 72 or 74 faces the person pushing the shopping cart and not the basket 12. This can also be reversed, so that the child faces forward. A divider 80 may be provided between the seats 72 and 74 to create separate seating areas. The vertical housing 70 may also include a storage department 78 embedded in the rear of the housing 70 for placing groceries or personal items therein. The storage area 78 may have a net (not shown) attached to its outer opening for securing items placed therein. Also, seat belts (not shown) are provided for securing a child to its designated seating area, 72 or 74. A handle 76 is provided at the top, rear of the vertical housing 70. The handle 76 provides a surface for a user to push the support structure 10 and can be configured to extend around the child seating areas 72 and 74 and thereby also serve as a restraining device and/or handle for a child in the child seats 72 and 74 to hold.

A hollow, horizontal base member 82 extends from the front, bottom of the vertical housing 70. The hollow, horizontal member 82 has an interior hollow cavity defined by a top surface and two side surfaces and an open end 90 at the bottom rear side of the vertical housing 70. The opening 90 in the vertical housing 70 is sized to accommodate the width of the top surface of the horizontal member 82 where it meets the vertical housing 70 at a base 92. The hollow, horizontal base member 82 has a tapered width that narrows from the base 92 and is configured to fit within the perimeter of the horizontal frame member 16 of a conventional cart 11. Stabilizing wheels 44 are provided at the perimeter of the bottom of the vertical housing 70 so that they do not obstruct the opening 90. At least one stabilizing wheel 44 is also provided under the hollow, horizontal member 82 at a distal end of the hollow cavity furthest from the opening 90, thereby making the support structure 10 freestanding. The hollow member 82 may be made with a dense material or is preferably weighted at its front end to create a low center of gravity that is not significantly offset by placing a child in the child seating areas 72 and 74, thereby creating a stable and safe child support attachment 10.

The hollow, horizontal base member 82 fully supports the weight of the cart by holding the cart 11 off of the ground and on its top surface. This is possible because the base member 82 has a channel 84 that is provided on either side of the horizontal member 82 near the base 92 that are configured to receive the rear caster wheels 22 of cart 11, and has a front recess 89 provided in front of the hollow cavity of member 82 for receiving the front caster wheels 24 of cart 11. Channels 84 and 89 have radii slightly larger than the outer radii of caster wheels 22 and 24 respectively. The channel 84 is configured to receive and secure the caster wheel 22 of the cart 11 once rolled up ramp 86. Likewise, front channel 89 is similarly configured to secure the front caster wheels 24 of cart 11 once rolled up ramp 87. As an additional safety feature, a wedge 88 can be placed before the ramp 86 at a distance at least equal to the diameter of a caster wheel 22 of the cart 11 away from ramp 86 with the high side of the wedge 88 facing the ramp 86 and having a height at least the radius of the caster wheel 22. Therefore, if the cart's caster wheel 22 should become inadvertently dislodged from channel 84 it will be prevented from rolling away from the support structure 10 by the high side of wedge 88. With wedge member 88, the cart 11 can only be dislodged from the support structure 10 if it is lifted upward so that caster wheel 22 can clear the large side of wedge 88. When a cart rests in channels 84 and 89 its rear side abuts the front side of the vertical housing 70 in a compact fashion.

Figure 18:
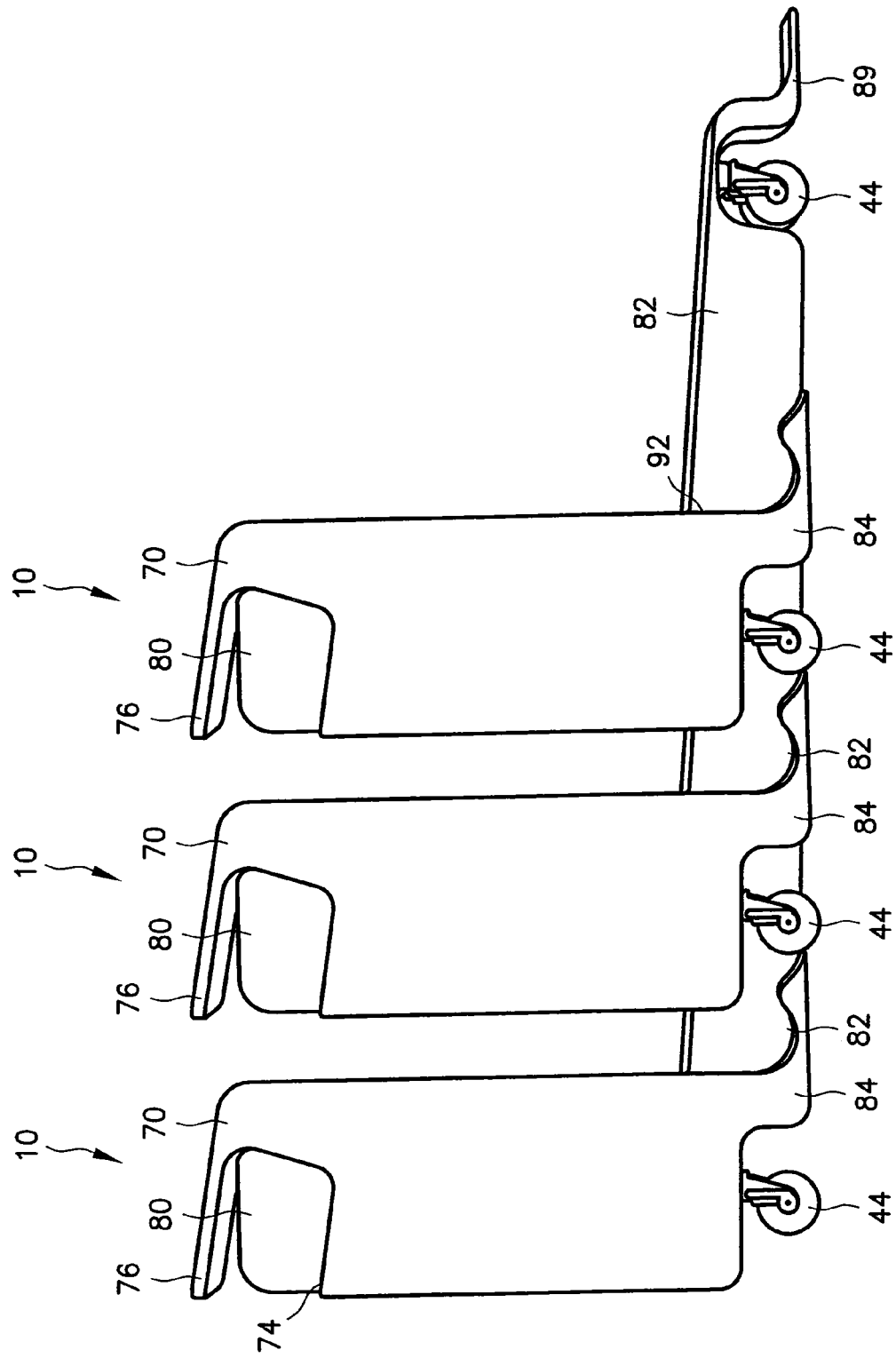
FIG. 18 shows a side view of the child support attachment embodiment shown in FIG. 17 nested horizontally to demonstrate the nesting capabilities of the child support attachment embodiments shown in FIGS. 14 through 17.
Figure 19:
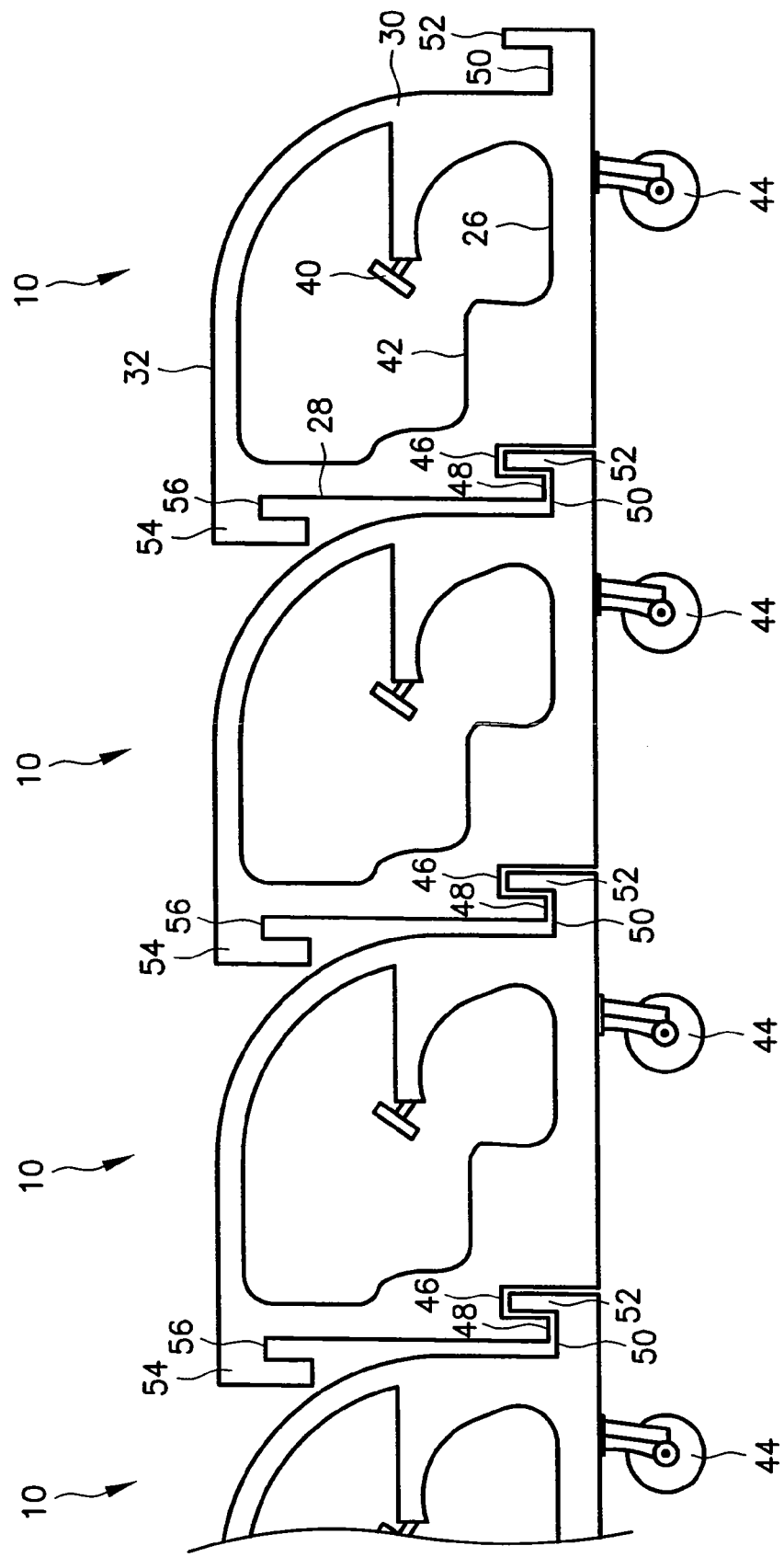
FIG. 19 illustrates a side view of the child support attachment embodiment shown in FIGS. 1 and 2 nested horizontally to demonstrate the nesting capabilities of the child support attachment embodiments shown in FIGS. 1 through 4 and 11 through 13.
Figure 20:
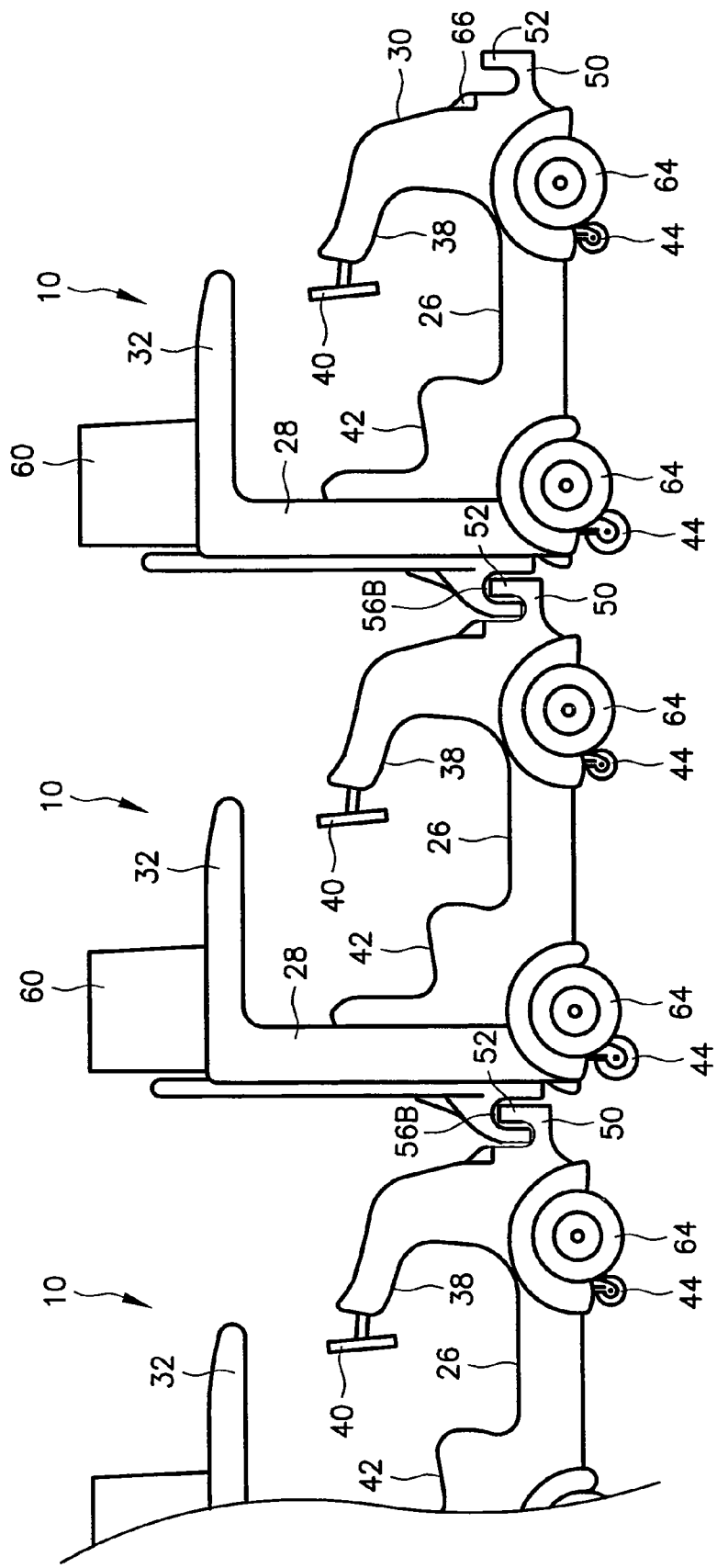
FIG. 20 shows a side view of the child support attachment embodiment shown in FIGS. 5 and 6 to further demonstrate the nesting capabilities of the child support attachment.

FIGS. 18 through 20 illustrate that the support structures 10 are stackable or nestable along a horizontal axis for convenience of storage and moving the support structures 10 in unison. Regarding FIG. 18, the support structure 10 as shown in FIGS. 14 through 17 are horizontally stacked. This is achieved by horizontally aligning the support structures 10 with the hollow, horizontal members 82 of a first support attachment 10 extending into the opening 90 of the housing 70 of another support attachment 10 in front of the first, thereby being received by the cavity of the hollow, horizontal member 82 of the another support structure 10 positioned in front of the first.

FIG. 19 illustrates a side view of the child support attachment 10 as shown in FIGS. 1 and 2 nested horizontally to demonstrate the nesting capabilities of the child support attachment embodiments shown in FIGS. 1 through 4 and 11 through 13. As shown, nesting is capable by aligning similarly suited support structures 10 horizontally and mating the notch 52 of the front bumper 50 of a first support structure 10 with the upper ledge 48 of a groove 46 of another similarly configured support structure 10 in front of the first.

FIG. 20, shows a side view of the child support attachment embodiment shown in FIGS. 5 and 6 to further demonstrate the nesting capabilities of the child support attachment 10. Here, nesting is accomplished by horizontally aligning similarly suited support attachments 10 and mating the notch 52 of the front bumper 50 of a first support structure 10 with the channel 56B of the channel member 54B of another support structure in front of the first. Similarly, the support attachments as shown in FIGS. 7 through 10 can be similarly stacked where a slot is located in the front wall of the structure 10 for receiving the horizontal member 54C and a horizontal bar within the slot is arranged to engage a channel 56C of the horizontal member 54C inserted into the slot.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A child carrier attachable to a shopping cart having a basket mounted to a frame supported by a plurality of caster wheels for contacting a ground surface, the shopping cart capable of use without the child carrier, said child carrier comprising:
a support member having at least one stabilizing wheel connected thereto for contacting said ground surface;
the support member having a bottom member, and further comprising a seat disposed on said support member; and
an attachment fixture connected to said support member for connecting said support member to said cart;
further comprising a nesting means connected to said support member, said nesting means being configured to engage a second nesting means connected to a second support member of a second child carrier when said second nesting means is horizontally aligned with said first carrier nesting means.

2. The child carrier as recited in claim 1, wherein said first and second nesting means each includes a male member and a female member, said male members being configured to engage said female members and said female members configured to receive said male members.

3. The child carrier as recited in claim 2, wherein said male members are a bumper having a notch extending therefrom and said female members are grooves having an upward ledge for engaging said notch.

4. The child carrier as recited in claim 2, wherein said male members are tapered front regions of said base member and said female members are an opening in a rear portion of said base members configured to receive said tapered front regions.

5. The child carrier as recited in claim 1, wherein said nesting means is also capable of being said attachment fixture for connecting said carrier to a cart when said carrier is not nested with a second carrier.

6. A method for nesting a child carrier attachable to a shopping cart having a basket mounted to a frame supported by a plurality of caster wheels for contacting a ground surface, the shopping cart capable of use without the child carrier, said child carrier comprising:
a support member having at least one stabilizing wheel connected thereto for contacting said ground surface;
the support member having a bottom member, and further comprising a seat disposed on said support member;
an attachment fixture connected to said support member for connecting said support member to said cart; and
a nesting means connected to said support member, said nesting means being configured to engage a second nesting means connected to a second base member of a second child carrier when said second nesting means is horizontally aligned with said first carrier nesting means, wherein said method comprises:
aligning horizontally said first carrier nesting means with said second nesting means; and
engaging said first and second nesting means.

7. The method of nesting as recited in claim 6, further comprising the step of repeating said aligning and engaging as desired.

8. The method of nesting as recited in claim 6, wherein said first and second nesting means each includes a male member and a female member, said male members being configured to engage said female members and said female members configured to receive said male members.

9. The method of nesting as recited in claim 8, wherein said male members are tapered front regions of said support member and said female members are an opening in a rear portion of said support members configured to receive said tapered front regions.

* * * * *